US012027077B2

(12) United States Patent
Thomas

(10) Patent No.: US 12,027,077 B2
(45) Date of Patent: Jul. 2, 2024

(54) FLOORING PANEL SAMPLE MODULE AND METHOD OF MANUFACTURE

(71) Applicant: Shaw Industries Group, Inc., Dalton, GA (US)

(72) Inventor: Adam Lee Thomas, Dalton, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/259,692

(22) PCT Filed: Feb. 1, 2023

(86) PCT No.: PCT/US2023/061749
§ 371 (c)(1),
(2) Date: Jun. 28, 2023

(87) PCT Pub. No.: WO2023/150551
PCT Pub. Date: Aug. 10, 2023

(65) Prior Publication Data

US 2023/0401982 A1 Dec. 14, 2023

Related U.S. Application Data

(60) Provisional application No. 63/267,462, filed on Feb. 2, 2022.

(51) Int. Cl.
*G09F 5/04* (2006.01)
*E04F 15/04* (2006.01)

(52) U.S. Cl.
CPC ................ *G09F 5/04* (2013.01); *E04F 15/04* (2013.01); *G09F 2005/043* (2013.01)

(58) Field of Classification Search
CPC ........ G09F 5/04; G09F 2005/043; G09F 5/00; E04F 15/04
USPC ............................................................ 434/75
See application file for complete search history.

(56) References Cited

U.S. PATENT DOCUMENTS

| | | | | |
|---|---|---|---|---|
| 2004/0018333 | A1* | 1/2004 | Chen | C09J 5/04 156/332 |
| 2007/0262039 | A1 | 11/2007 | Biser | |
| 2016/0148545 | A1 | 5/2016 | Donadee et al. | |
| 2018/0347207 | A1* | 12/2018 | Hayes | B32B 7/09 |
| 2019/0257079 | A1* | 8/2019 | Smith | E04B 1/86 |

FOREIGN PATENT DOCUMENTS

| | | | |
|---|---|---|---|
| EP | 0872821 | A2 | 10/1998 |
| WO | 2021130658 | A1 | 7/2021 |

OTHER PUBLICATIONS

PCT Application No. PCT/US2023/061749, International Search Report and Written Opinion, dated Jun. 6, 2023, 14 pages.

* cited by examiner

*Primary Examiner* — Robert P Bullington
*Assistant Examiner* — Stephen Alvesteffer
(74) *Attorney, Agent, or Firm* — Laura Labeots; Lathrop GPM LLP

(57) ABSTRACT

A flooring panel sample module and method of manufacturing the same. The module provides superior construction integrity without relying on the unpredictable performance of glue.

20 Claims, 5 Drawing Sheets

FLOORING PANEL SAMPLE MODULE AND METHOD OF MANUFACTURE

CROSS-REFERENCE TO RELATED APPLICATIONS

This application is a U.S. national phase application under 35 U.S.C. § 371 of International Patent Application No. PCT/US23/61749, filed Feb. 1, 2023, which claims the benefit of priority to U.S. Provisional Patent Application No. 63/267,462, filed on Feb. 2, 2022, the entirety of each are incorporated by reference.

BACKGROUND

Flooring panel samples are displayed in retail establishments so that consumers can compare and select preferred flooring materials. Flooring panel samples comprise an upper portion that represents the surface one views and walks on as well as backing material (e.g. foam) that is disposed on the bottom portion (i.e. the portion facing the subfloor when in use). In the prior art, such flooring panel samples are typically glued to a backer board which provides a degree of stiffness to the sample. However, plasticizer migration from the foam backing of the sample is capable of degrading the strength of the glue bond. Environmental factors such as temperature and humidity may exacerbate this glue degradation problem over time. Thus, a glue solution that works initially may not provide adequate bonding in the long term.

Separation of the flooring panel sample from the backer board can pose a risk of physical harm to consumers and to sales personnel handling such samples as the samples are typically heavy (e.g. in the 20 to 30 pounds range). This can also disqualify the sample for continued use, resulting in increased expense associated with replacing such lost samples, loss of sales due to the absence of suitable samples, and an increase in waste.

BRIEF SUMMARY

The presently disclosed systems and methods pertain to a flooring panel sample module and method of manufacturing the same. The module provides superior construction integrity without relying on the unpredictable performance of glue, thus preventing injury to consumers or sales personnel handling sample modules, increasing sample availability and reducing waste that would otherwise result from failed sample modules.

In a first aspect, the present disclosure pertains to a flooring panel sample module comprising a flooring panel sample, peripheral trim disposed on a peripheral edge of the floor panel sample, adhesive disposed on a bottom surface of the peripheral trim, a backer board adhered to the adhesive, and plural rivets disposed through the flooring panel sample and the backer board.

In an embodiment, the flooring panel sample is comprised of plural flooring planks. In this embodiment, at least one of the plural rivets may be disposed through one or more of the plural flooring planks and the backer board.

In one embodiment, the flooring planks are rectangular in shape. In said embodiment, the rectangular flooring planks may be arranged to form a substantially square shaped floor panel module (See, FIGS. 1-6). The peripheral trim may be disposed on the periphery or edges of the square shaped flooring panel module. The peripheral trim is comprised of four trim portions, each disposed on a respective peripheral edge of the flooring panel sample. In some example embodiments, the flooring planks may be square. Further, in some example embodiments, the flooring planks may be arranged to form any appropriate shape (e.g., rectangle).

In yet another embodiment, the flooring panel sample may be resilient, rigid or composite flooring. In some embodiments, the flooring panel sample may include soft surface flooring such as carpet or carpet tiles.

In a further embodiment, the peripheral trim is J-channel trim. In this embodiment, the J-channel trim may be vinyl J-channel trim, which may be clear. Further, the J-channel trim may be provided in four discrete portions.

In yet a further embodiment, the adhesive is double-sided tape disposed on the bottom surface of the peripheral trim.

In yet another embodiment, the rivets are clear vinyl rivets.

In a further embodiment, the rivets are double cap rivets.

In another embodiment, the flooring panel sample module further comprises a handle formed through the flooring panel sample and the backer board.

In another aspect, the present disclosure pertains to a method of manufacturing a flooring panel sample module, the method comprising providing a flooring panel sample, disposing peripheral trim on a peripheral edge of the flooring panel sample, disposing an adhesive on a bottom edge of the peripheral trim, disposing a backer board in contact with the adhesive, and disposing plural rivets between the flooring panel sample and the backer board.

In an embodiment, providing a flooring panel sample comprises joining plural flooring planks to form the flooring panel sample. In this embodiment, disposing plural rivets between the flooring panel sample and the backer board may include disposing at least one rivet between one or more flooring planks and the backer board.

In another embodiment, disposing the peripheral trim on the peripheral edge of the flooring panel sample comprises disposing each of four portions of peripheral trim on a respective peripheral edge of the flooring panel sample.

In yet another embodiment, the peripheral trim is J-channel trim.

In a further embodiment, disposing the adhesive on the bottom edge of the peripheral trim comprises disposing double-sided tape on the bottom edge of the peripheral trim.

DETAILED DESCRIPTION OF EXEMPLARY EMBODIMENTS

Figure 1:
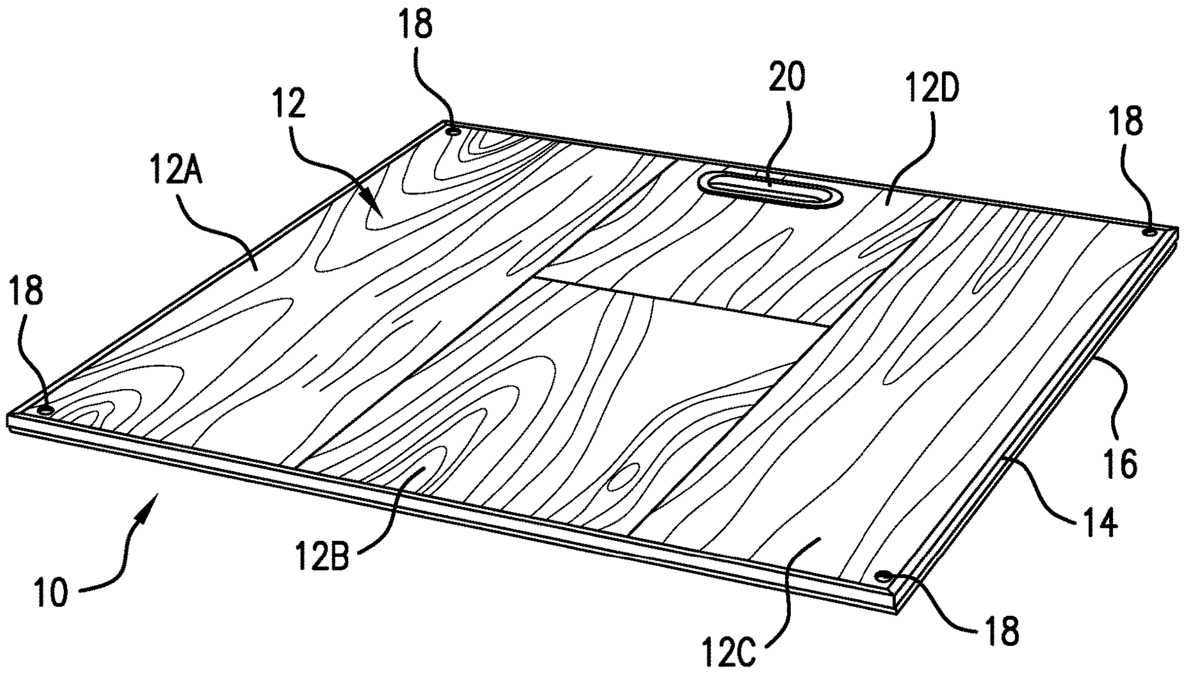
FIG. 1 is a top and side perspective view of a flooring panel sample module according to the present disclosure.

Disclosed is a flooring panel sample module 10 and a method 100 for manufacturing such flooring panel sample modules. The flooring sample 12 disposed within the module may be a single piece or may be composed of plural flooring planks 12A, 12B, 12C, 12D, such as shown in FIG. 1. In some examples, planks 12B and 12D may be a single plank that has a visual appearance that provides the look of two separate planks. Each plank may include an upper, visible face and an attached backing layer on an underside that is not visible but that is normally provided as part of the flooring planks. The module is rectangular in shape, meaning that it has four right-angle corners and linear peripheral edges between each pair of corners. In the illustrated embodiment, the module has a square projection. In one such embodiment, the module backer boards 16 are 23⅝"× 23⅝". This enables eight backer boards of this size to be realized from a standard 4'×8' sheet.

Figure 2:
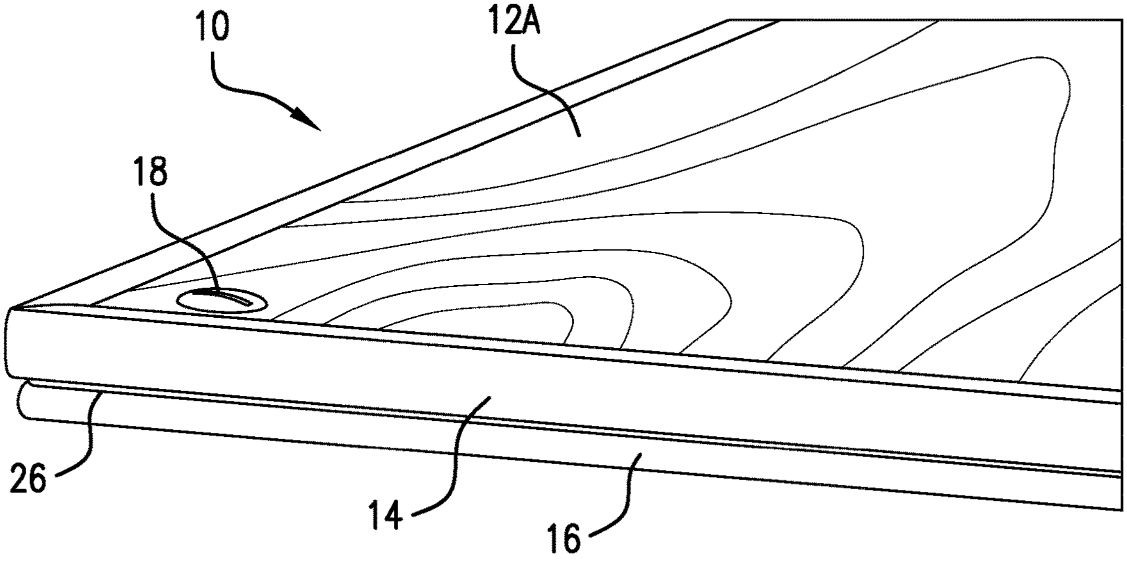
FIGS. 2 and 3 are partial views of the flooring panel sample module of FIG. 1.
Figure 3:
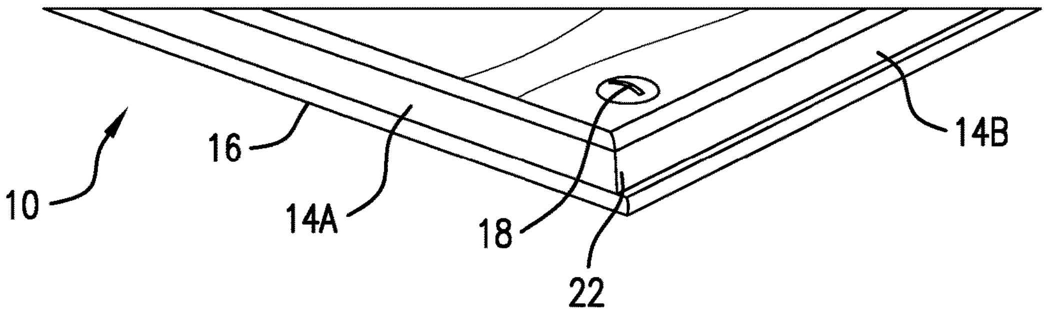
Figure 4:
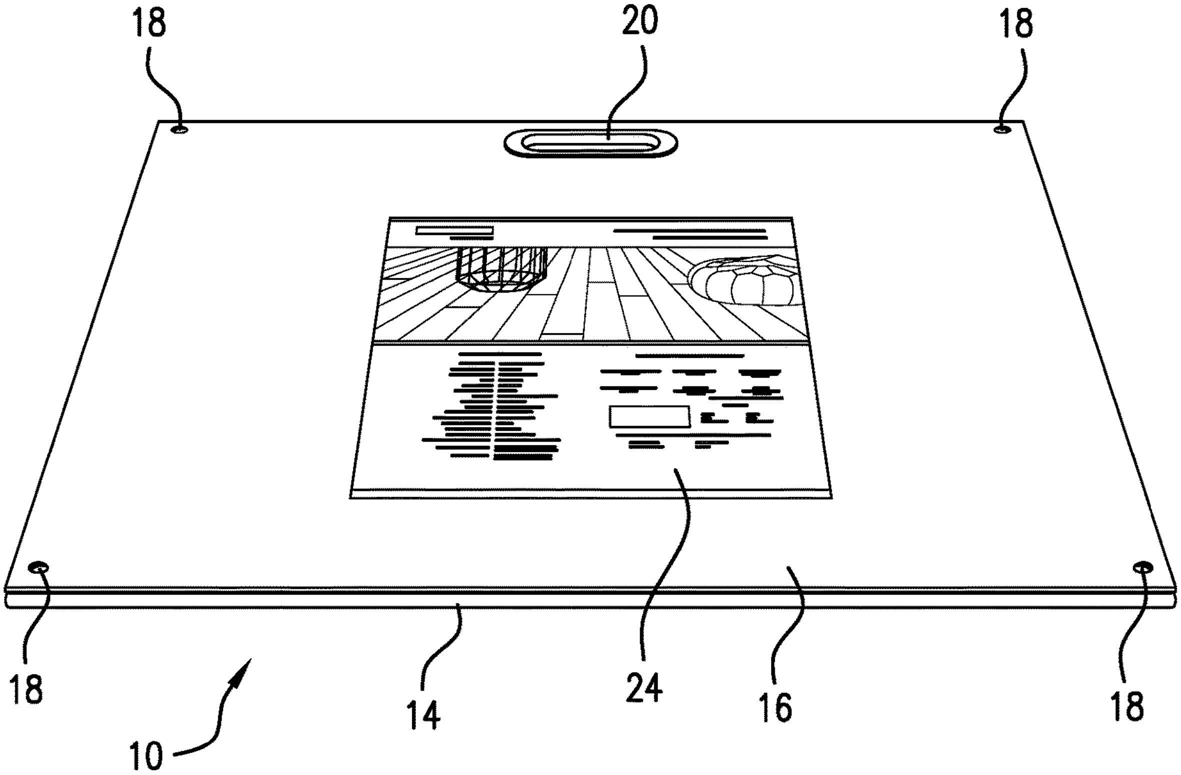
FIG. 4 is a rear and side perspective view of the flooring panel sample module of FIG. 1.

With reference to FIGS. 1-3, each flooring sample panel module 10 is comprised of a flooring panel sample 12 surrounded by peripheral trim 14. This trim is preferably provided as J-channel trim which may be formed of polyvinyl chloride (PVC) and in an embodiment is clear. Providing clear peripheral trim has the aesthetic benefit of minimizing any visual distraction contributed by the trim when viewing the sample.

The dimensions of the J-channel trim 14 depend upon the thickness of the flooring panel sample 12. With respect to FIG. 7, exemplary values for the J-channel trim include:

| | A | B | C | D |
|---|---|---|---|---|
| 3/16" J-channel | 0.626" | 0.284" | 0.265" | 0.030" |
| ¼" J-channel | 0.626" | 0.315" | 0.265" | 0.030" |
| 5/16" J-channel | 0.626" | 0.395" | 0.265" | 0.030" |
| ⅜" J-channel | 0.626" | 0.445" | 0.265" | 0.030" |
| ½" J-channel | 0.626" | 0.578" | 0.265" | 0.030" |

Figure 5:
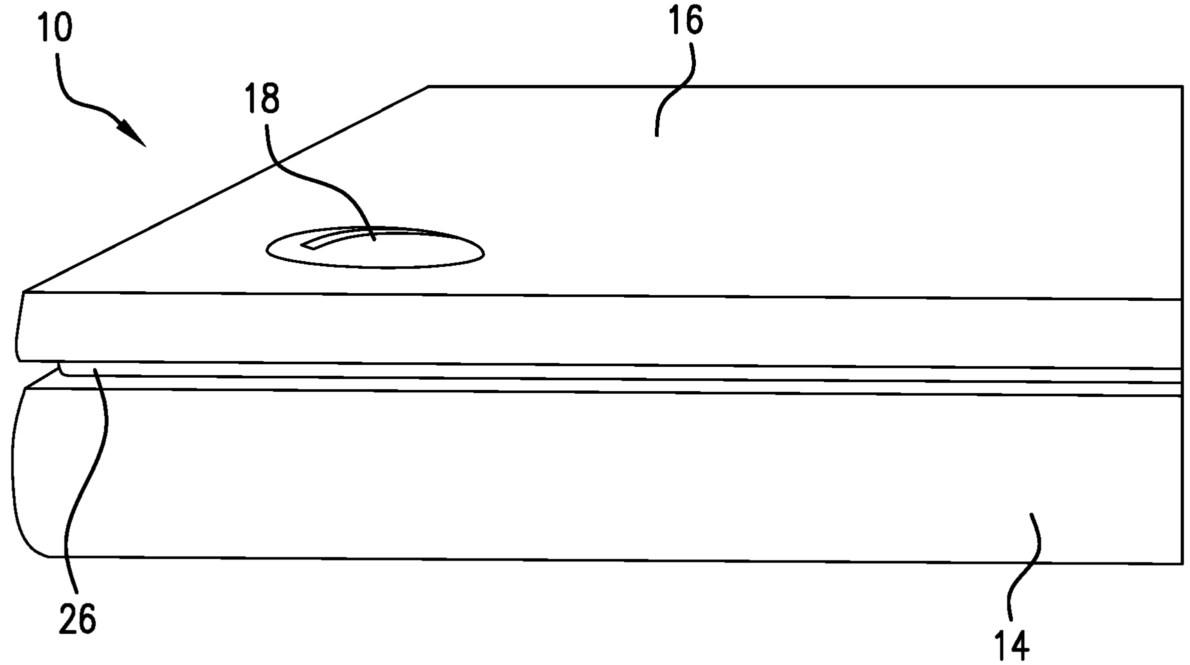
FIGS. 5 and 6 are partial views of the flooring panel sample module of FIG. 4.
Figure 7:
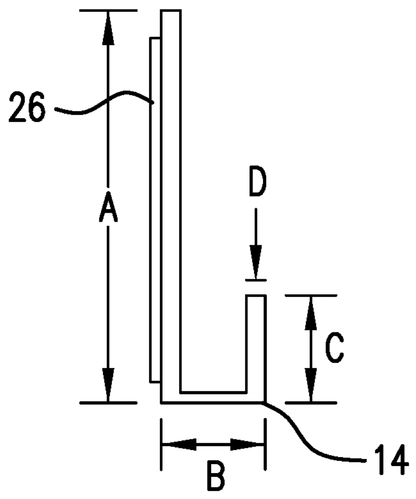
FIG. 7 is a side view of peripheral trim used in the flooring panel sample module of FIG. 1.

Surface A of the J-channel trim 14 is the bottom surface. As seen in FIGS. 2, 5 and 7, double-sided tape 26 is disposed on this bottom surface. Surface B of the trim faces outward. Surface C faces up and frames the flooring portion sample 12. Dimension D is the thickness of the trim.

Figure 6:
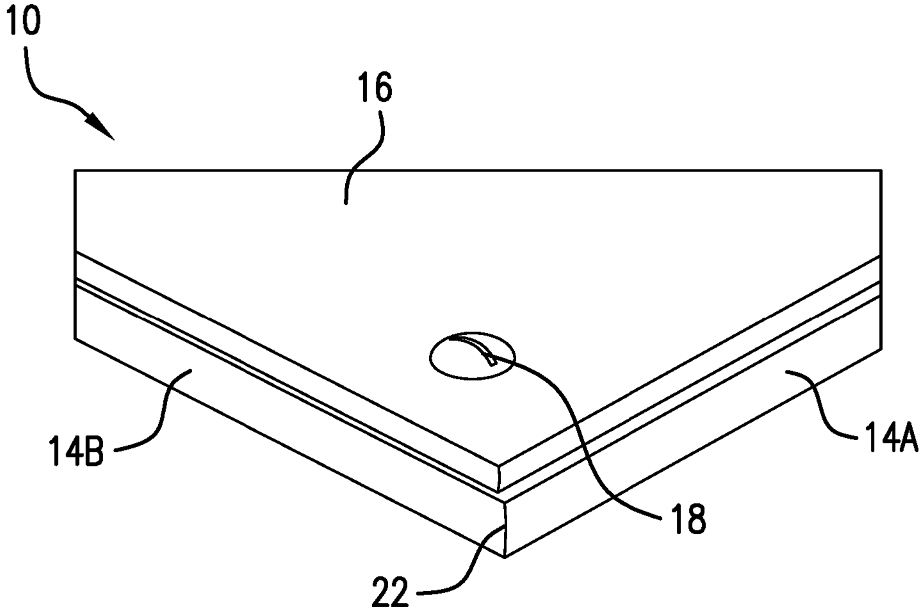

As best seen in FIGS. 3 and 6, the peripheral trim 14 is provided in discrete, linear portions 14A, 14B, each portion having 45° beveled ends 22 that abut complimentary ends of adjacent portions.

In an alternative embodiment, the peripheral trim 14 portions are discontinuous. This embodiment may be lower in cost due to less material used. However, exposed edges of the trim material may present a risk of physical harm to users of the modules 10 and may cause friction when storing the modules in display facilities.

A coated tape (not labeled) may be provided on the exposed face of the double-sided tape 26. For assembling the module 10, this coated tape is removed, exposing the adhesive of the double-sided tape. The tape in one embodiment is modified acrylic on conformable acrylic closed cell foam. It is 0.60 mm thick, 12.70 mm or 0.5" wide, and has a density of 715 kg/m 3. It has a normal tensile strength of 365 N/6.54 cm 2 or 50 $\#/in^2$. In an alternative embodiment, the tensile strength is 35 $\#/in^2$. In a particular embodiment, the tape is Very High Bond (VHB) Heavy Duty Mounting Tape.

A backer board 16 is then positioned proximate to the J-channel trim 14. Preferably, the backer board is centered with respect to the flooring panel sample 12 and peripheral trim. The backer board maybe provided of ¼ " THB or ¼ " MDF, though the use of THB may be beneficial as it is denser and thus more stiff and less likely to bow. A product information label 24 describing characteristics of the respective flooring panel sample may also be applied to the backer board as desired.

With the backer board 16 in place against the adhesive of the double-sided tape 26 and thus in position with respect to the peripheral trim 14 and flooring panel sample 12, vertically/axially aligned holes (not labeled) for receiving rivets 18 are formed in the flooring panel sample and backer board. These holes are preferably 5/16" in diameter.

In the illustrated embodiment, each hole is 9/16" from the edges of the respective J-channel trim 14 pieces to the center of the hole. Four such holes are formed, each in a respective corner of the module 10.

In an alternative embodiment of a flooring panel sample module 10 in which there are plural flooring panel sample planks 12A, 12B, 12C, 12D, at least one hole is provided through planks 12C and 12A (near the corners of the sample module 10), with a complimentary hole formed in the backer board 16, for receiving a respective rivet 18. This inhibits the ability of individual planks (12A and 12C) from moving with respect to each other and the backer board. The handle 20 may inhibit the movement of the middle planks 12B and 12D.

Figure 8:
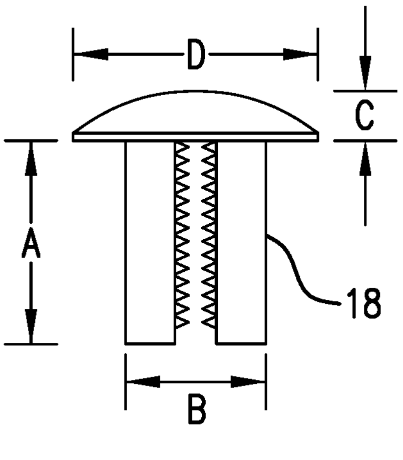
FIG. 8 is a cross-sectional view of a ratchet rivet used in the flooring panel sample module of FIG. 1.

Disposed within each hole are double capped rivets 18. In an embodiment, these rivets are polycarbonate ratchet rivets. Providing clear rivets minimizes any visual distraction the rivets would be otherwise caused when viewing the flooring panel sample. The length of the rivet will depend on the thickness of the flooring panel sample 12 and backer board 14. Exemplary dimensions for the rivet shown in FIG. 8 are:

| | A | B | C | D |
|---|---|---|---|---|
| Long Rivet | 0.500" | 0.260" | 0.750" | 0.400" |
| Short Rivet | 0.350" | 0.260" | 0.750" | 0.400" |

Rivets 18 are installed using two rivet portions in each hole, each portion entering from a respective side of the module 10. The inwardly facing teeth mutually engage and serve to hold the flooring panel sample 12, surrounded by the peripheral trim 14, against the backer board 16, without the need for glue.

For ease of manipulation, the flooring panel sample module 10 may be further provided with a handle 20. This handle may be formed of male and female interlocking vinyl pieces that are inserted through a complimentarily formed aperture (not labeled) through the flooring panel sample 12 and backer board 16.

Figure 9:
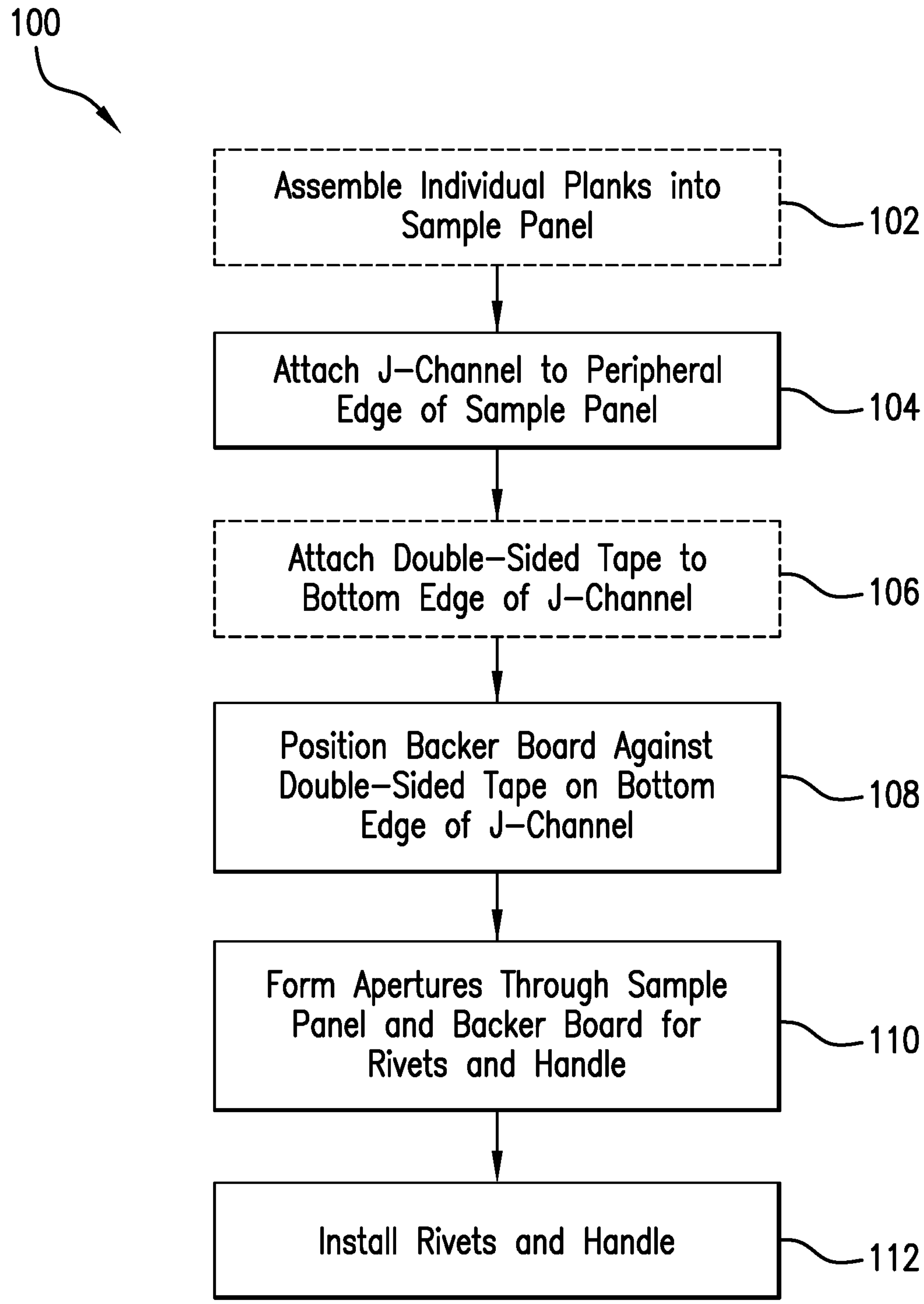
FIG. 9 is a flow chart illustrating steps in a method of manufacture for the flooring panel sample module of FIG. 1.

A method 100 of assembling a flooring panel sample module 10 is described with respect to FIG. 9.

In a first optional step 102, individual flooring panel sample planks 12A, 12B, 12C, 12D are assembled into a sample panel 12. If the sample panel is one piece, this step is not required.

Peripheral trim 14 is then attached 104 to the peripheral edges of the sample panel. As disclosed herein, the peripheral trim in J-channel trim.

If the peripheral trim 14 is sourced with double-sided tape 26 already applied thereto, the next step 106 is not required. Otherwise, double-sided tape is positioned with respect to a bottom surface of the peripheral trim with the adhesive exposed.

Next, the backer board 16 is positioned 108 against the exposed adhesive of the double-sided tape 26 on the bottom surface of the peripheral trim 14.

Apertures for receiving the rivets 18 and handle 20 are formed 110 in the flooring panel sample 12 and backer board 16.

Lastly, the rivets 18 and handle 20 are installed 112, completing the flooring panel sample module 10.

While FIGS. 1-6 illustrate a floor panel sample module 10 having four rivets at the corners of the sample module 10, in other example embodiments, the sample module 10 may include fewer rivets. For example, the sample module 10 may include only two rivets (in two corners). In yet another example embodiment, the sample module may not include the rivets. Further, in some example embodiments, the sample module may not include an adhesive tape disposed on the bottom of the peripheral trim 14. The peripheral trim 14 separates the backing material of the floor planks 12 from the adhesive and thereby prevents the plasticizer migration. The continuous peripheral trim 14 around the sample module 10 allows easy insertion and removal of the sample modules from the display facilities (i.e., without interfering with and getting stuck in the display facilities).

Alternative embodiments of the subject matter of this application will become apparent to one of ordinary skill in the art to which the present invention pertains, without departing from its spirit and scope. It is to be understood that no limitation with respect to specific embodiments shown here is intended or inferred.

What is claimed is:

1. A flooring panel sample module, comprising:
- a flooring panel sample;
- peripheral trim disposed on a peripheral edge of the floor panel sample;
- adhesive disposed on a bottom surface of the peripheral trim;
- a backer board adhered to the adhesive; and
- plural rivets disposed through the flooring panel sample and the backer board.

2. The flooring panel sample module of claim 1, wherein the flooring panel sample is comprised of plural flooring planks.

3. The flooring panel sample module of claim 2, wherein at least one of the plural rivets is disposed through each of the plural flooring planks and the backer board.

4. The flooring panel sample module of claim 1, wherein the flooring panel sample is rectangular and the peripheral trim is comprised of four trim portions, each disposed on a respective peripheral edge of the flooring panel sample.

5. The flooring panel sample module of claim 4, wherein the flooring panel sample is square.

6. The flooring panel sample module of claim 1, wherein the flooring panel sample is selected from the group consisting of comprised of rigid, resilient or composite flooring.

7. The flooring panel sample module of claim 1, wherein the peripheral trim is J-channel trim.

8. The flooring panel sample module of claim 7, wherein the J-channel trim is vinyl J-channel trim.

9. The flooring panel sample module of claim 8, wherein the vinyl J-channel trim is clear vinyl J-channel trim.

10. The flooring panel sample module of claim 7, wherein the J-channel trim is comprised of four discrete portions of J-channel trim.

11. The flooring panel sample module of claim 1, wherein the adhesive is double-sided tape disposed on the bottom surface of the peripheral trim.

12. The flooring panel sample module of claim 1, wherein the rivets are clear vinyl rivets.

13. The flooring panel sample module of claim 1, wherein the rivets are double cap rivets.

14. The flooring panel sample module of claim 1, wherein the flooring panel sample module further comprises a handle formed through the flooring panel sample and the backer board.

15. A method of manufacturing a flooring panel sample module, comprising:
- providing a flooring panel sample;
- disposing peripheral trim on a peripheral edge of the flooring panel sample;
- disposing an adhesive on a bottom edge of the peripheral trim;
- disposing a backer board in contact with the adhesive; and
- disposing plural rivets between the flooring panel sample and the backer board.

16. The method of claim 15, wherein providing a flooring panel sample comprises joining plural flooring planks to form the flooring panel sample.

17. The method of claim 16, wherein disposing plural rivets between the flooring panel sample and the backer board comprises disposing at least one rivet between each flooring panel and the backer board.

18. The method of claim 15, wherein disposing the peripheral trim on the peripheral edge of the flooring panel sample comprises disposing each of four portions of peripheral trim on a respective peripheral edge of the flooring panel sample.

19. The method of claim 15, wherein the peripheral trim is J-channel trim.

20. The method of claim 15, wherein disposing the adhesive on the bottom edge of the peripheral trim comprises disposing double-sided tape on the bottom edge of the peripheral trim.

* * * * *